Figure 1:
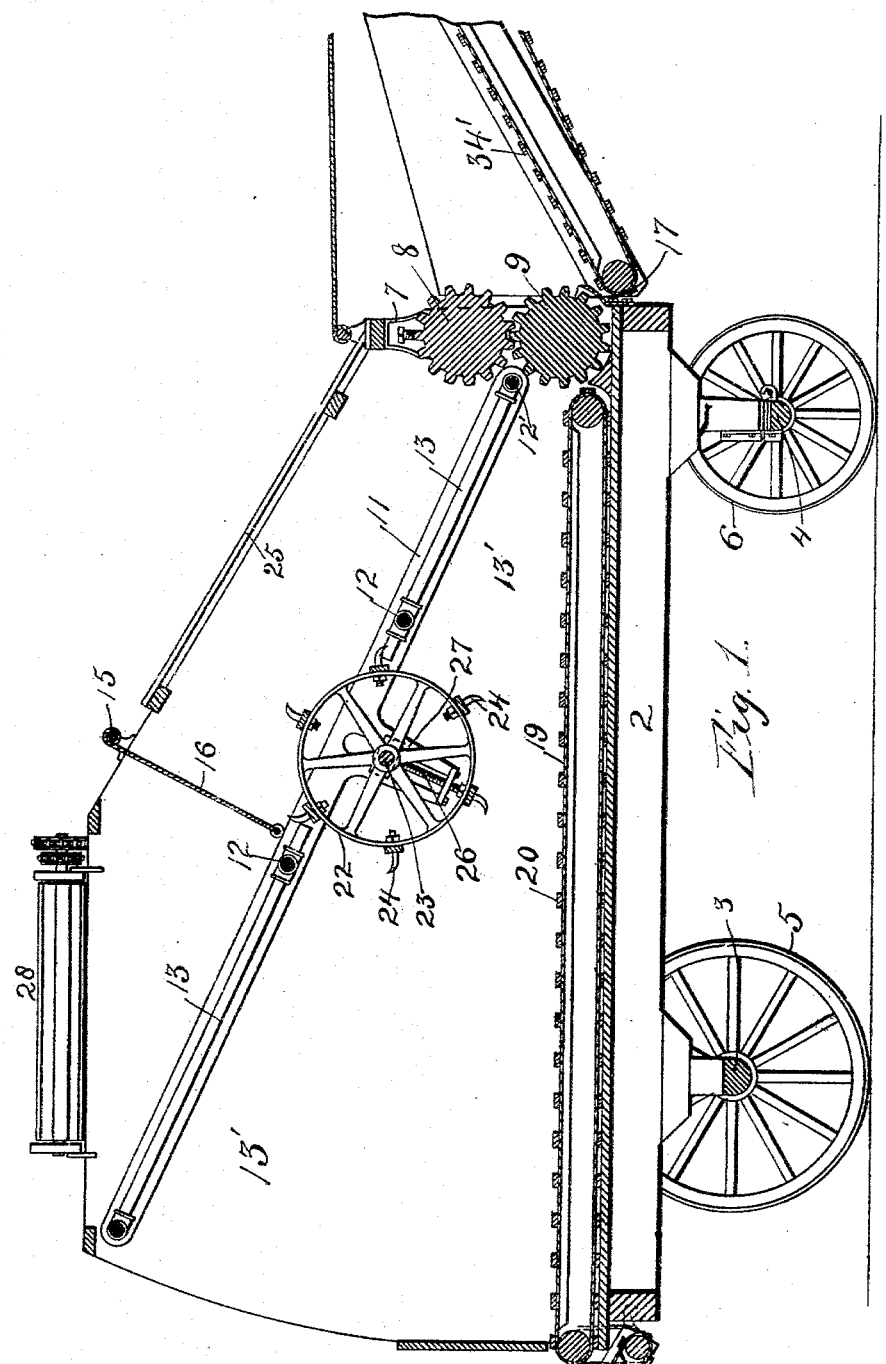

(No Model.) 2 Sheets—Sheet 1.

J. T. SMITH.
FLAX CLEANING AND REDUCING MACHINE.

No. 511,221. Patented Dec. 19, 1893.

Witnesses
G. E. Purple
F. S. Lyon

Inventor
John T. Smith
By Paul G. Hawley Atty's

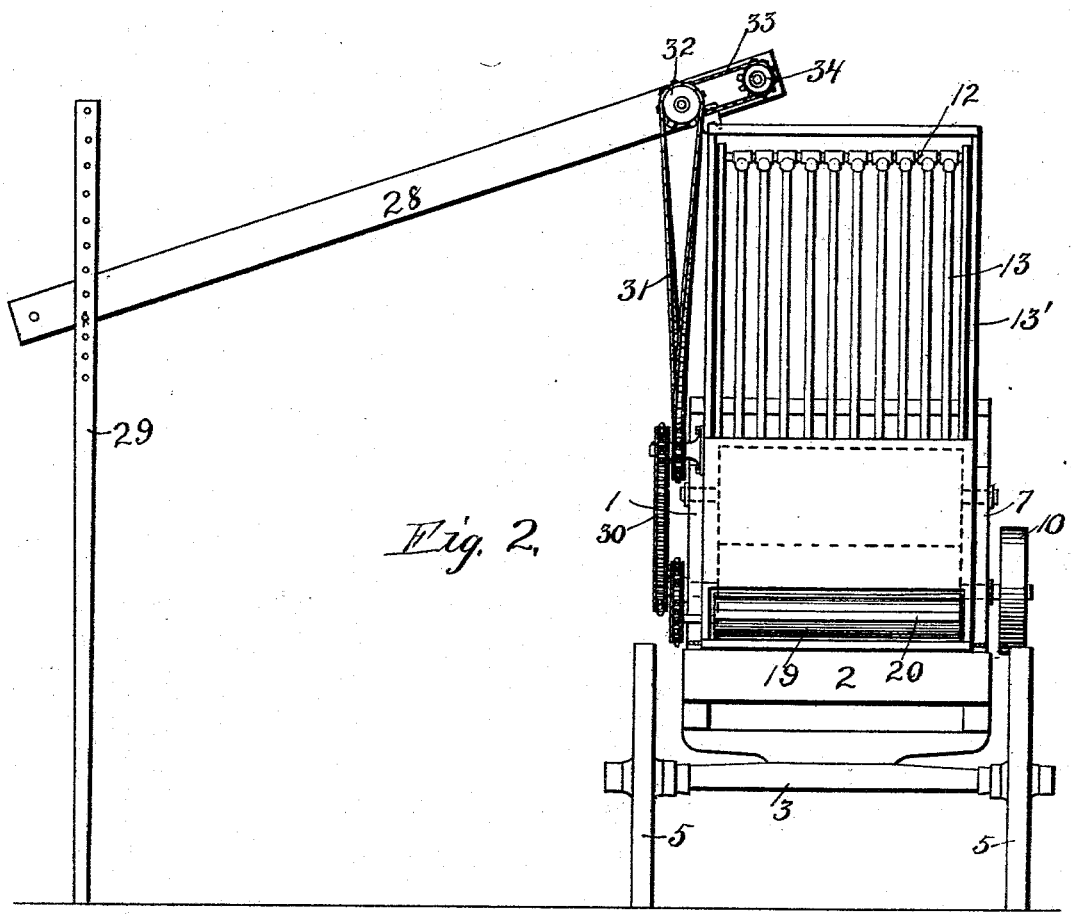

UNITED STATES PATENT OFFICE.

JOHN T. SMITH, OF HERON LAKE, MINNESOTA.

FLAX CLEANING AND REDUCING MACHINE.

SPECIFICATION forming part of Letters Patent No. 511,221, dated December 19, 1893.

Application filed March 31, 1893. Serial No. 468,417. (No model.)

*To all whom it may concern:*

Be it known that I, JOHN T. SMITH, of the city of Heron Lake, county of Jackson, State of Minnesota, have invented certain new and useful Improvements in Flax Cleaning and Reducing Machines, of which the following is a specification.

My invention relates to a machine adapted for field use, in breaking flax, hemp or jute to prepare the same for the reducing mill; and the principal object which I have in view is to provide a machine adapted for use directly in the field where the flax or other product is grown, and by means of which most of the heavy foreign substances clinging to the straw may be separated from the fiber, which may then be shipped at a comparatively low cost owing to the great decrease in weight and bulk.

To this end my invention consists in the combination with brake rolls, of an inclined slotted bottomed feed table projecting down toward said rolls to deliver the crude material thereto; further, in combination with the above, a rapidly rotating picker, beater or tosser operating through said table and adapted to agitate the material thereon to shake out the foreign material before the stock passes into the rolls.

Further, my invention consists in means for conveying away both the reduced and cleaned fiber and also the shives falling through the openings in the feed table and those accumulating beneath the rolls.

My invention will be more readily understood by reference to the accompanying drawings, in which—

Figure 1 is a longitudinal vertical section of a machine embodying my invention. Fig. 2 is an end view thereof, in which the rotating beater is omitted.

As shown in the drawings, 2 represents a frame mounted upon the axles 3 and 4, having the wheels 5 and 6 and the forward axles being pivoted with the usual king bolt so that the machine may be readily handled in the field and drawn into any desired position alongside of the straw stack. Upon the forward end of the frame I provide two or more standards 7 provided with bearings for the shafts of one or more pairs of corrugated brake rolls 8 and 9. The lower roll is driven by an engine belt operating over a large pulley 10 arranged upon the roll shaft (see Fig. 2). The movement of the lower roll is communicated to the upper one through the long teeth of the two rolls which mesh together. The inclined feed table is made up of the side bars 11, cross bars or pipes 12 and the separated longitudinal pipes or rods 13, and the entire table is hinged or pivoted upon the lower cross pipe or bar 12' which is supported in the siding 13' extending forward from the frame. The pitch of the table may be altered by means of a cross shaft 15 extending across the top of the frame and from which ropes 16 extend down to the attachments upon the side bars of the table. A crank and ratchet-and-pawl fastening is provided in connection with the shaft 15 for locking the same in any position. The material may be thrown directly from the stack upon the upper end of the inclined feed table and from thence slide down over the slotted surface thereof and pass from the lower end of the table between the corrugated brake rolls where the straw is thoroughly broken or crumpled without severing the long fibers, but with the result of breaking up the woody portions of the straw which will drop out over the forward side of the lower roll and drop thence into the receiving trough 17 arranged beneath the roll. The foreign substances and the short straw will drop through the slots between the longitudinal bars or pipes and will fall upon the top of the long conveyer 19 provided with the cross slats 20 and extending substantially the full length of the machine and adapted to carry the shives and waste portions back and drop the same upon the waste conveyer 21, the lower end of which extends beneath the end of the conveyer 19. The shives which accumulate in the trough 17 are passed out by the revolution of the roll and are taken up by the forward end of the conveyer 19, and thence carried back to the conveyer 21, which conveyer 21 may drop the waste material either into a wagon to be hauled away, or into a fanning mill where the flax or other seed is separated from the strictly waste portions.

In order to shake out all of the short straw, seed and foreign substances, I preferably provide a long cylinder 22 arranged upon a shaft 23 and provided with a series of hooked or curved teeth 24 which operating through the top of the inclined table or floor, catch up the material sliding down on the same and throw the same upward to fall again upon the lower end of the table so that the small particles are rattled out through the same.

To prevent the picker from throwing the material clear over the front of the machine I preferably provide a guard or cover 25 upon the front of the frame, as shown in Fig. 1. This picker or tosser is rendered adjustable by mounting the shaft boxes or bearings upon the screws 26 and arranging the boxes within guides 27 which preferably extend down from the side bars 11 of the table. By this means the feed to the rolls may be regulated and any degree of agitation secured upon the material. When working at a long stack and in order to avoid the necessity of carrying the material from one end of the stack to the other so as to drop it upon the inclined table, I preferably provide a long lateral conveyer 28 which rests upon the top of the siding and has its lower end adjustably supported by the legs 29. By using this long lateral conveyer I am enabled to dispense with several men upon the stack as the fork-fulls of straw may be readily thrown from any part of the stack upon some part of the long conveyer and will be carried thence to the feed table. The conveyer 19 is preferably driven by a sprocket belt extending from the shaft of the lower brake roll and from the same shaft a second sprocket belt 30 extends over a sprocket pulley arranged on the picker-shaft 23. When the lateral conveyer is employed the same is driven by means of a twisted belt 31 operated from the lower brake roll and extending over a sprocket pulley 32 arranged on the side of the conveyer trough and from an accompanying wheel, from which a short belt 33 extends to the sprocket wheel 34 arranged on the upper shaft of the lateral conveyer. The fiber conveyer 34' may be driven from either one of the roll shafts, while the end conveyer 21 is driven by a sprocket belt extending from a sprocket wheel on the end shaft of the conveyer 19 and similar sprocket wheel upon the shaft of the lower roll of the conveyer 21.

By the use of the above described machine I am enabled to take crude flax or hemp, jute or like material and thoroughly separate the long fiber thereof from both foreign substances and shives, producing the fiber ready for the market as crude tow, or ready for the reducing and finishing mill, in either case saving much in the cost of transportation of either the loose or baled.

By employing the fanning mill in connection with my machine I am further enabled to save much of the seed which would otherwise be lost.

Having thus described my invention, I claim as new and desire to secure by Letters Patent—

1. The combination, in a flax cleaning and reducing machine, of brake rolls, with means for driving the same, and an inclined and slotted table adapted to direct the material into said rolls, and means for disposing of the waste material falling through said slotted table, substantially as described.

2. The combination, in a portable field machine for treating flax, hemp or jute, of brake rolls, with an inclined and slotted feed table, inclined toward said rolls to deliver the stock thereto, a picker or tosser operating through said table to agitate the material thereon, and means for disposing of the waste material falling through said floor, substantially as described.

3. The combination, in a portable field machine for treating flax or like material, of corrugated brake rolls, with an inclined feed table composed of longitudinally arranged and separated bars having slots between them, a picker or tosser operating through said floor to agitate the material thereon, and means for altering the inclination of said floor, substantially as described.

4. The combination, in a portable machine for treating flax or like material, of corrugated brake rolls, the inclined feed table composed of longitudinally arranged bars or pipes having slots between them, means for altering the inclination of said table, the trough arranged beneath the lower brake roll, the long conveyer 19 arranged in the bottom of the machine and adapted to receive the waste material from said trough and that falling through said inclined floor, a rotating picker or tosser operating through an opening in said floor and adapted to agitate the material descending thereon, means for raising and lowering said tosser, and conveyers for conducting away the fiber and the waste material, respectively, substantially as described.

In testimony whereof I have hereunto set my hand this 23d day of March, 1893.

JOHN T. SMITH.

In presence of—
C. G. HAWLEY,
M. E. GOOLEY.